United States Patent
Broome

(10) Patent No.: US 9,857,017 B2
(45) Date of Patent: Jan. 2, 2018

(54) DEBRIS DIVERTING INLET

(71) Applicant: Akron Brass Company, Wooster, OH (US)

(72) Inventor: Layton Michael Broome, Wooster, OH (US)

(73) Assignee: Akron Brass Company, Wooster, OH (US)

( * ) Notice: Subject to any disclaimer, the term of this patent is extended or adjusted under 35 U.S.C. 154(b) by 0 days.

(21) Appl. No.: 14/927,883

(22) Filed: Oct. 30, 2015

(65) Prior Publication Data

US 2017/0122486 A1  May 4, 2017

(51) Int. Cl.
| | | |
|---|---|---|
| F16L 55/24 | (2006.01) | |
| B01D 45/08 | (2006.01) | |
| A62C 8/00 | (2006.01) | |

(52) U.S. Cl.
CPC ............... *F16L 55/24* (2013.01); *A62C 8/00* (2013.01)

(58) Field of Classification Search
CPC ... B01D 45/04; B01D 45/08; Y10T 137/7792; Y10T 137/794; Y10T 137/2829
USPC ...... 137/544, 140, 561 A; 55/423, 462, 463, 55/307, 342, 392, 393, 394, 421; 138/41
See application file for complete search history.

(56) References Cited

U.S. PATENT DOCUMENTS

| | | | |
|---|---|---|---|
| 540,539 A * | 6/1895 | Conness | 55/336 |
| 796,429 A * | 8/1905 | Huxley | A47L 9/1666 55/413 |
| 890,537 A * | 6/1908 | Stanley | B04C 5/103 55/391 |
| 2,385,745 A * | 9/1945 | Vogt | B04C 5/12 55/392 |
| 2,673,062 A * | 3/1954 | Cornelius | F16K 15/026 137/540 |
| 3,148,043 A * | 9/1964 | Richardson | B01D 45/08 415/169.2 |
| 3,605,787 A * | 9/1971 | Krogfoss | F16K 1/12 137/219 |
| 3,684,857 A * | 8/1972 | Morley | F02C 7/05 210/201 |
| 3,832,086 A * | 8/1974 | Hull, Jr. | B04C 3/06 137/15.1 |
| 4,213,021 A * | 7/1980 | Alexander | F16K 37/0033 137/540 |
| 4,508,138 A * | 4/1985 | Dixon | F16K 47/04 137/239 |
| 4,582,081 A * | 4/1986 | Fillman | F16K 15/145 137/218 |
| 5,054,518 A * | 10/1991 | Rancani | A61M 27/006 137/516.27 |

(Continued)

*Primary Examiner* — Craig Schneider
*Assistant Examiner* — Nicole Gardner
(74) *Attorney, Agent, or Firm* — Tucker Ellis LLP; Michael G. Craig

(57) ABSTRACT

One or more techniques and/or systems are disclosed for a fluid inlet that mitigates uptake of undesired debris into fluid transport system. A fluid inlet can direct fluid toward one or more fluid inlets, and debris entrained in the fluid may bypass the fluid inlet(s). The fluid inlet can be used to mitigate uptake of debris into a fluid transport system, when placed in the path of fluid flow. A shape of the fluid inlet can be configured to direct fluid flow into the fluid inlet(s), while the shape allows debris entrained in the fluid to flow past the fluid inlet(s).

20 Claims, 6 Drawing Sheets

(56) References Cited

U.S. PATENT DOCUMENTS

| | | | | |
|---|---|---|---|---|
| 5,584,314 A | * | 12/1996 | Bron | A61M 27/006 137/239 |
| 6,270,558 B1 | * | 8/2001 | Theiler | B01D 45/16 55/282.3 |
| 6,681,792 B2 | * | 1/2004 | Edward | F16K 3/265 137/15.06 |
| 6,994,738 B2 | * | 2/2006 | Taddey | B01D 45/04 55/306 |
| 2016/0116918 A1 | * | 4/2016 | Nakamura | G05D 7/00 137/544 |

* cited by examiner

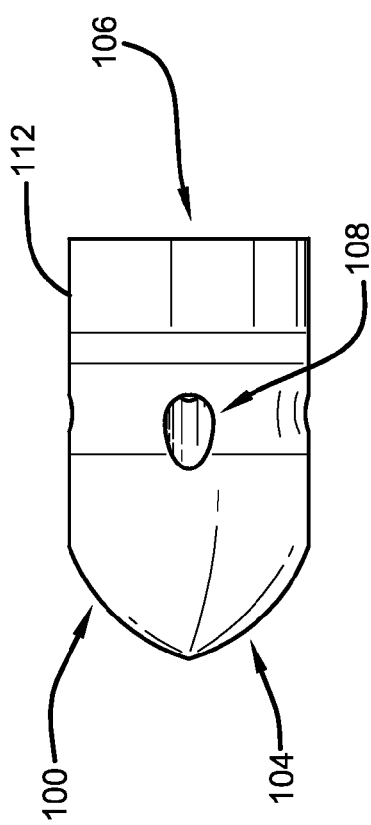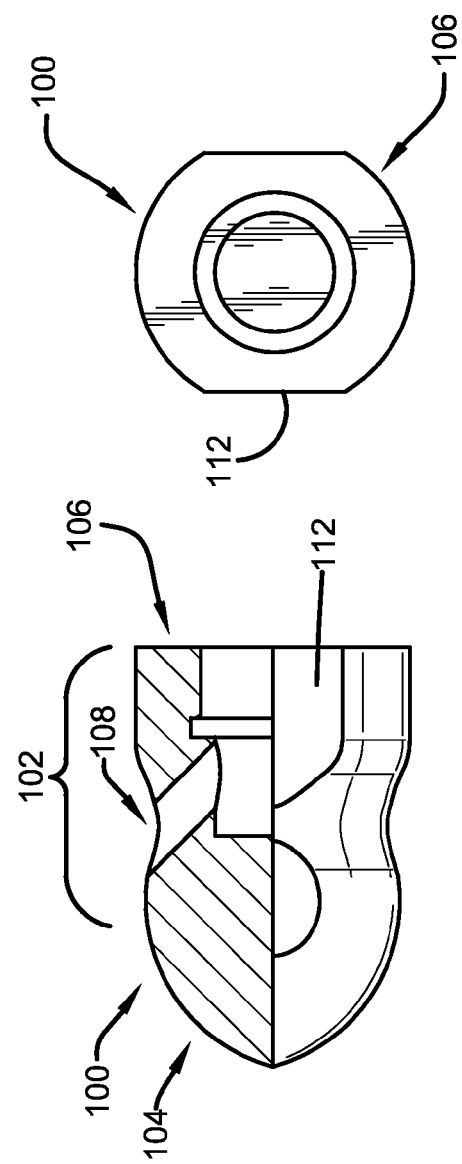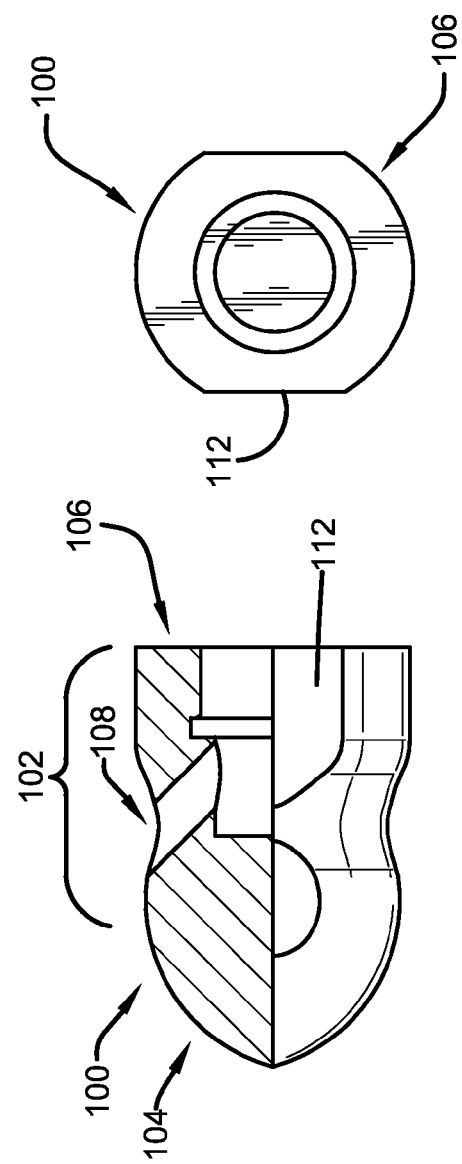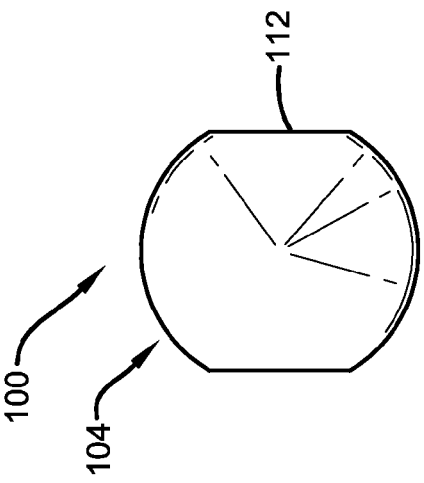

DEBRIS DIVERTING INLET

BACKGROUND

Fluids can be transported from a fluid source and dispensed at a desired location, such as using hoses, tubes, lines, etc. A fluid inlet for a fluid transport system can be disposed at or near the fluid source, and the fluid may be drawn into the fluid inlet to be transported by the system. One such fluid transport system can comprise a fluid dispensing system, such as a pump and nozzle, with one or more fluid lines therebetween. Occasionally, the fluid source can comprise undesired debris, such as sand, silt, dirt, and other debris particles and matter. Such debris can become lodged, or otherwise interact with certain portions of a fluid transport system, resulting in undesired operation characteristics, such as clogging, diminished operation, etc. Typically, screens are used to filter undesired debris; however, filters can become clogged, necessitating system shutdown and cleaning.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a fluid inlet that mitigates uptake of undesired debris into fluid transport system. An inlet design may be utilized that direct fluid toward one or more fluid inlets, while mitigating uptake of undesired debris into the inlet(s). The fluid inlet can be coupled to a fluid transport system and placed in the path of fluid flow. Fluid entrained with debris can be directed across its surface, where fluid comprising less debris is directed toward an inlet opening, and fluid comprising entrained debris is directed along the flow path.

In one implementation, a device for mitigating debris uptake in a fluid inlet disposed in a fluid flow path can comprise a lateral surface. Further, the device can comprise a leading end that may be configured to be disposed in a fluid flow path to divert fluid to the lateral surface while mitigating turbulence in the flow of fluid. The device can comprise a trailing end that is configured to operably couple with a fluid transport component. Additionally, a valley can be disposed, at least partially, around the perimeter of the lateral surface, generally perpendicular to the flow of the fluid. The valley may be configured to allow a fluid to flow into the valley while mitigating a flow of debris, entrained in the fluid, into the valley. At least one fluid inlet can be disposed in the valley, and the fluid inlet can be fluidly coupled with the fluid transport component when the trailing end is operably coupled with the fluid transport component.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIGS. 1A-F are component diagrams illustrating example implementations of an exemplary device for diverting debris from a fluid inlet.

DETAILED DESCRIPTION

Figure 1A:
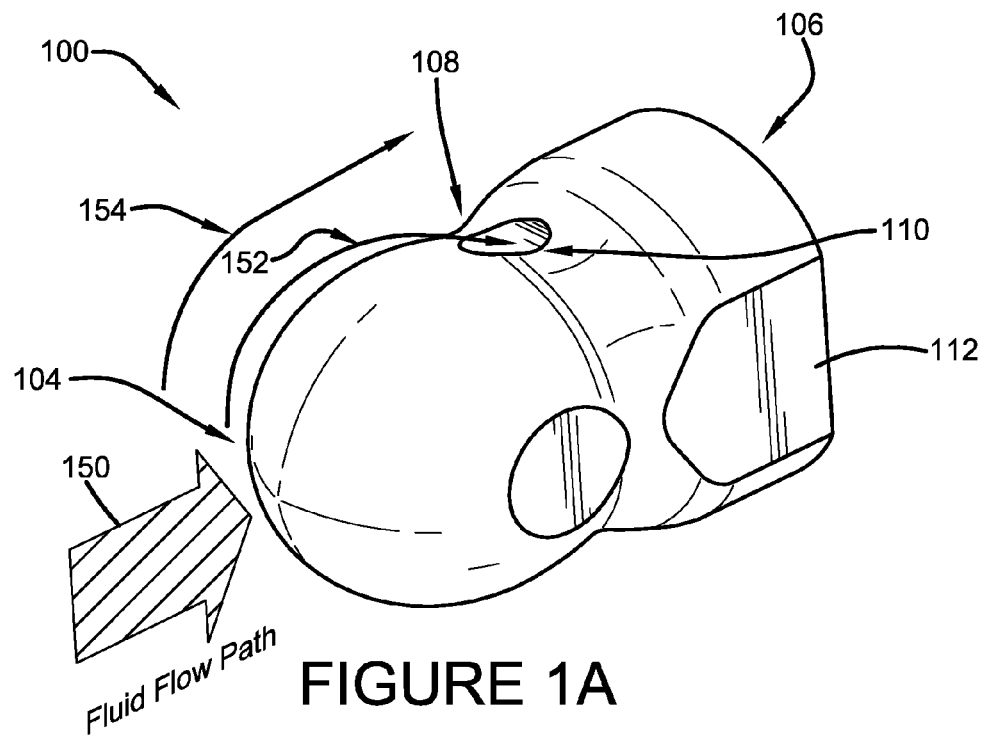

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

A fluid inlet device and/or system may be devised can mitigate introduction of debris (e.g., entrained in the fluid) into a fluid conduit coupled with the inlet. That is, for example, typical fluid inlets that are placed in a fluid flow path utilize some type of screen to filter out debris from fluid entering the inlet. In one implementation, for example, the device may instead utilize characteristics of the fluid to draw merely the fluid into the inlet, while allowing the entrained debris to pass over, or by-pass the inlet.

As one example, water can be characterized by its inherent surface tension properties, which can result in the water adhering to the surface of a solid body, following the contours of a surface when flowing. Further, in this example, debris (e.g., sand, silt, other minerals, particles, flotsam, etc.) entrained in the water may merely flow in a path that follows the path of a conduit in which the water is flowing, and may not follow the surface contours of a body disposed in the fluid flow path. That is, for example, the water may flow into a depression in a body, and the debris may flow over the depression. In this example, at least a portion of the inlet may be disposed in the depression, allowing water to flow into the inlet in the depression, while the debris flows over the depression, by-passing the inlet.

Figure 1B:
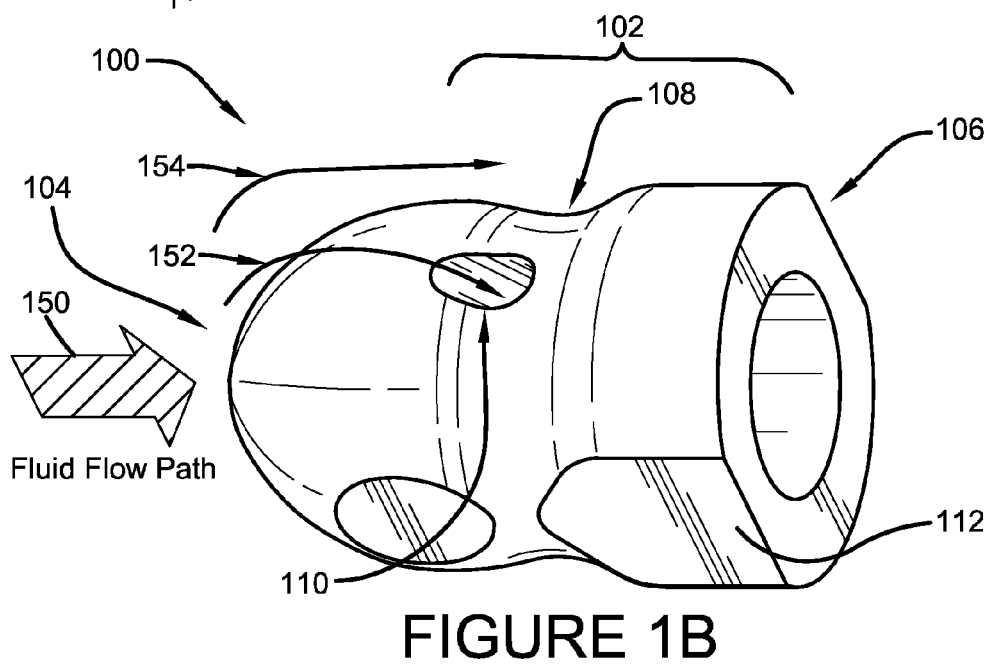
Figure 2:
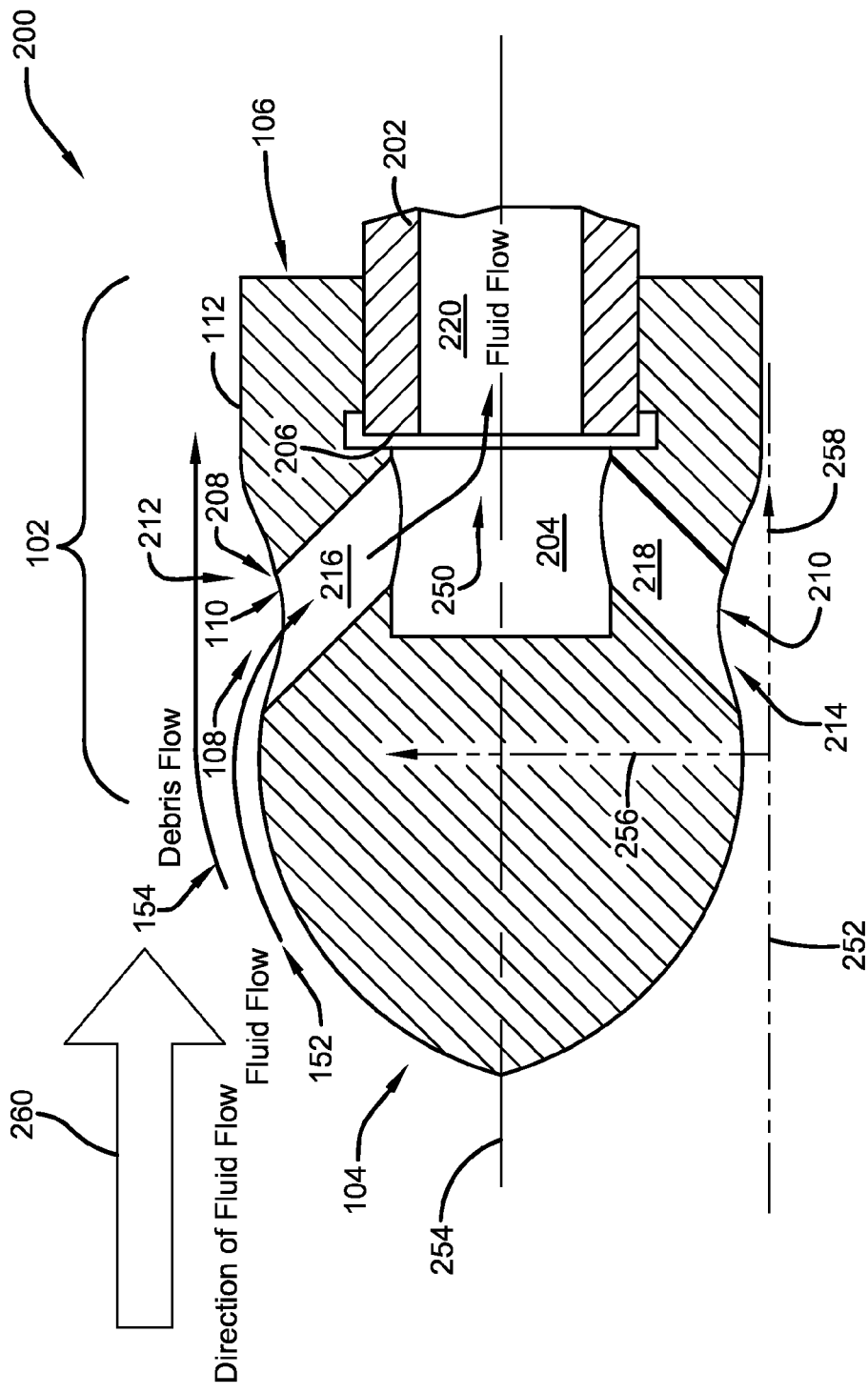
FIG. 2 is a component diagram illustrating an example implementation of one or more portions of one or more components described herein.

FIG. 1 is a component diagram illustrating an example implementation of an exemplary device 100 for diverting debris from a fluid inlet. FIG. 2 is a component diagram illustrating a component diagram of an example implementation 200 of a lateral section of one or more portions of one or more systems described herein. In one implementation, a device for mitigating debris uptake in a fluid inlet disposed in a fluid flow path can comprise a lateral surface 102. As an example, the lateral section or portion 102 of the example device may comprise the lateral side(s) of the device, which may comprise one or more portions of a cylinder wall (e.g., or otherwise convex-shaped, such as portions of a frustoconical-shaped wall), one or more flat walls, one or more concave walls, or combinations thereof.

In this implementation, the exemplary device 100 can comprise a leading end 104. The leading end 104 can be configured to be disposed in a fluid flow path 150 to divert fluid to the lateral surface 102 while mitigating turbulence in the flow of fluid 150. As an example, the leading end 104 can comprise a shape that favorably mitigates turbulence in the fluid flow path 150, such as a dome shape, conical shape, half-sphere or ellipsoid shape, or portions thereof, which can merge with a generally cylindrically-shaped lateral surface. For example, a nose portion of the leading end 104 can be disposed in the direction of fluid flow 260, and the shape of the nose of the leading end 104 is configured to direct the fluid flow 150 to the lateral surface or portion 102 of the exemplary device 100.

Further, in this implementation, the exemplary device 100 can comprise a trailing end 106 that may be configured to operably couple with a fluid transport component 202. In one implementation, as illustrated in FIG. 2, the trailing end 106 can comprise a generally flat portion, comprising a portion that is configured to receive, and couple with, a leading end 206 of the fluid transport component 202. As an example, the coupling between the trailing end 106 and the fluid transport component 202 may comprise a generally water tight coupling, configured to allow fluid flow 220 between the exemplary device 100 and the fluid transport component 202. In one implementation, the lateral surface 102 can comprise a generally frustoconical shape, where a leading end of the lateral surface 102 comprises a smaller circumference than the circumference of a trailing end of the lateral surface 102. As an example, the exemplary device 100 can comprise a generally bullet-shaped design, which typically provides for less fluid turbulence when placed in the path of fluid flow 150. Additionally, the fluid transport component can comprise any type of tube, hose, pipe, capillary or other fluid transport device used to transport fluid.

As illustrated in FIGS. 1 and 2, the exemplary device 100 can comprise a valley 108 disposed, at least partially, around the perimeter of the lateral surface 102, and disposed generally perpendicular to the flow of the fluid 260. In this implementation, the valley can be configured to allow a fluid to flow 152 into the valley 108 while mitigating a flow of debris 154, entrained in the fluid, into the valley 108. That is, for example, certain fluids (e.g., those comprising water) may exhibit capillarity characteristics that result in the fluid flow 152 following the surface of the valley, while the entrained debris flows 154 over the valley. For example, capillarity can result from a combination of liquid cohesion (e.g., liquid molecule's cohesive forces between each other) and adhesive forces between the liquid and a surface with which the liquid is in contact. The capillarity can allow the fluid to follow the surface of the exemplary device 100, over the leading end 104 to the lateral surface 102, and into the valley or depression 108 formed in the lateral surface 102 of the device 100.

As illustrated in FIGS. 1 and 2, the exemplary device 100 can comprise at least one fluid inlet 110 disposed in the valley 108. In one implementation, the fluid inlet 110 may be fluidly coupled with the fluid transport component 202 when the trailing end 106 is operably coupled with the fluid transport component 202. For example, a first fluid inlet opening 208 may be disposed in a first portion of the valley or depression 108 in the lateral portion of the body 102, and a second fluid inlet opening 210 may be disposed in a second portion of the valley or depression 108 in the lateral portion of the body 102. As another example, a first valley 108 may comprise the first and second fluid inlet opening 208, 210; or a first valley or depression 212 may comprise the first fluid inlet opening 208, and a second valley or depression 214 may comprise the second fluid inlet opening 210. Additionally, as another example, the exemplary device may comprise a plurality of inlets with openings (e.g., 108, 210) in a valley/depression (e.g., 108, 212, 214) disposed in one or more valleys or depressions (e.g., 108) around the perimeter of the lateral surface 102.

As an illustrative example, an entrance (e.g., opening 208, 210) of the at least one fluid inlet 108 can be disposed below a plane comprising a line 252 lying in a direction of fluid flow 260 along the lateral surface 102. In this way, in one implementation, as illustrated in FIGS. 1 and 2, fluid comprising entrained debris may follow the fluid flow path 150, in which the exemplary device 100 is disposed. In this implementation, the fluid flow 152 may follow the surface of the leading end 104, to the lateral surface 102, and into the valley 108, where it may enter the fluid inlet 110, 210. Further, in this implementation, the flow of the debris entrained in the fluid 154 may pass over the valley 108. In this way, for example, the fluid flow 220 into the fluid transport component 202 may comprise less debris than that of the initial fluid flow 150, and the fluid entrained debris can be diverted around the fluid inlets 110, 210.

Figure 3:
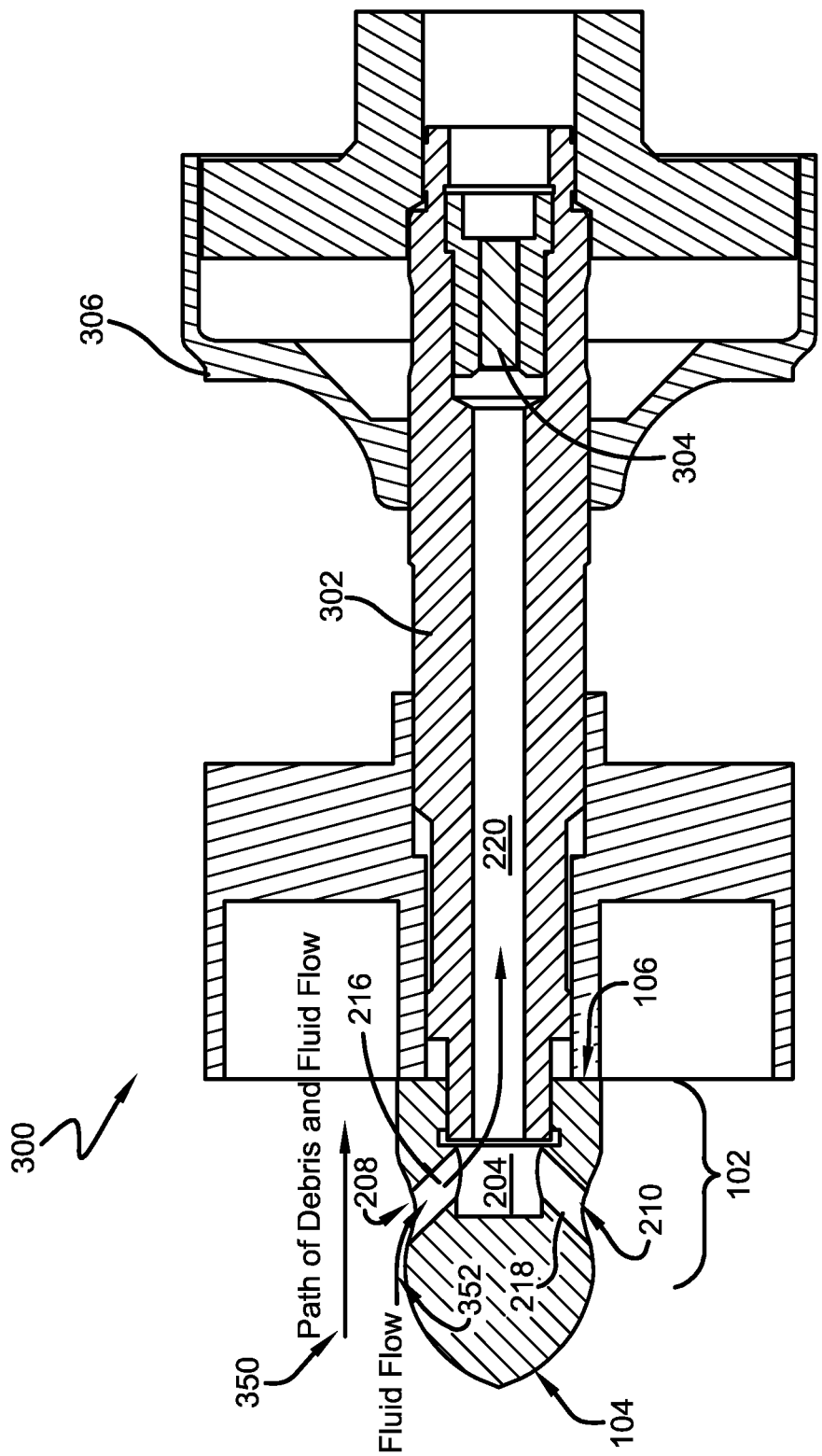
FIG. 3 is a component diagram illustrating an example implementation of one or more portions of one or more components described herein.
Figure 4:
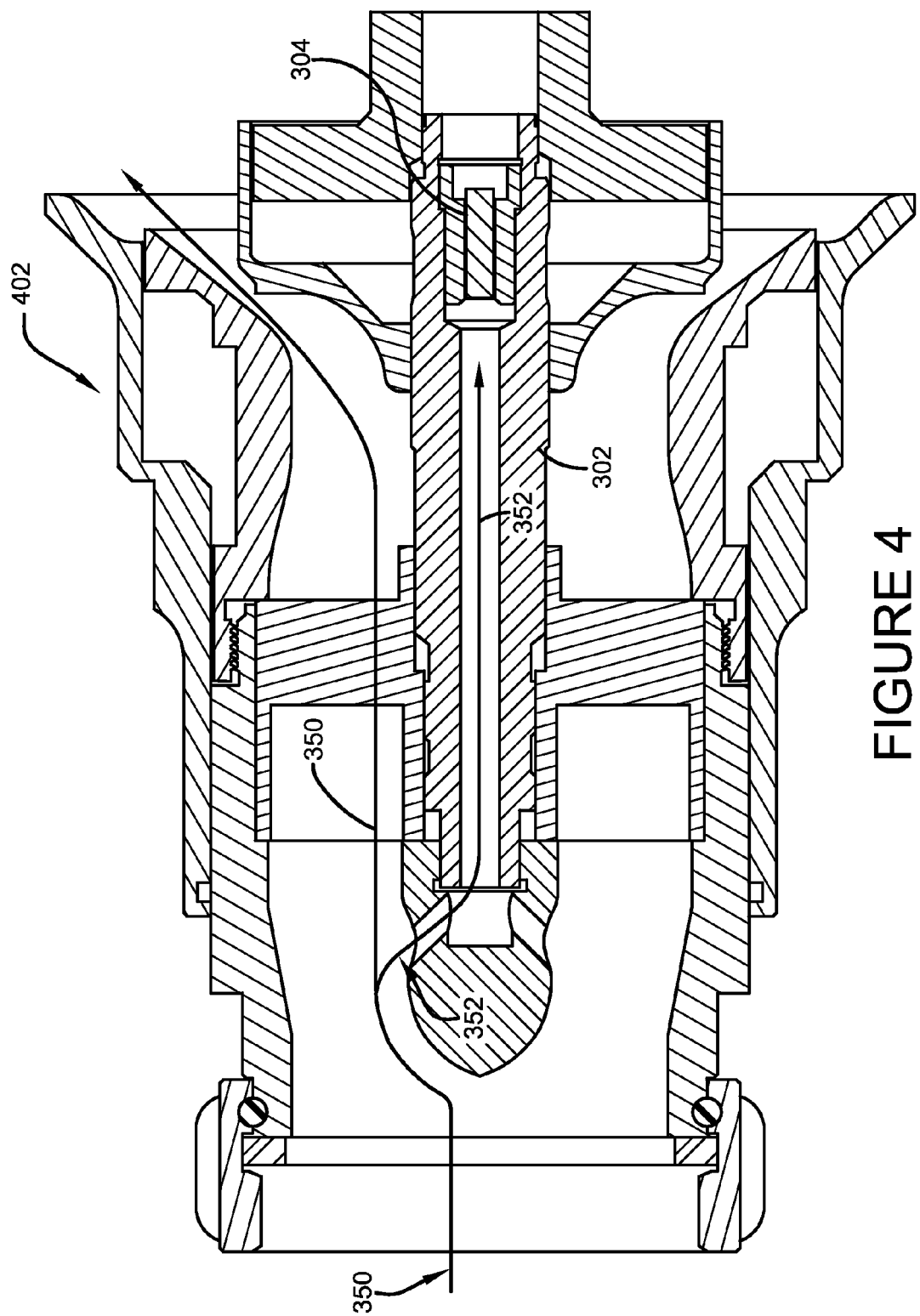
FIG. 4 is a component diagram illustrating an example implementation of one or more portions of one or more components described herein.

FIGS. 3 and 4 are component diagrams illustrating example implementations of one or more portions of one or more systems described herein. With continued reference to FIGS. 1 and 2, in these example implementation, a device 300 that may be used to mitigate uptake of debris into a fluid inlet can be coupled with a nozzle stem 302. As an example, a fluid dispensing nozzle 402 may be used to dispense firefighting fluid, such as to control a fire. In some implementations, a fluid dispensing nozzle 402 can comprise a centrally disposed stem 302, which may use fluid pressure to adjust fluid dispensing characteristics of the nozzle 402. In this example, the fluid pressure may be indicated from the fluid that enters the stem 302 through the example device 300. For example, a valve 304 may be disposed at the distal end of the stem 302, and the valve 304 may be biased toward the proximal end of the stem 302. In this example, a desired amount of fluid pressure (e.g., set to a threshold for a desired purpose) may be used to overcome the biasing force, which can result in the fluid flowing through (e.g., or around) the valve 304. As another example, an example nozzle 402 may comprise a baffle 306 that can be used to direct fluid flow discharge, and/or control fluid discharge characteristics (e.g., fluid pressure, fluid flow rate). In this example, the baffle 306 can move laterally to regulate fluid discharge of the nozzle 402 under various flow conditions. Further, for example, fluid pressure of the fluid flow in the stem tube 220 can be transferred into a baffle chamber, resulting in a baffle head force that combines the fluid pressure and biasing force of a spring in the baffle head area to move the baffle 306 laterally.

In one implementation, as illustrated in FIGS. 1 and 2, the lateral surface 102 can comprise at least one tool engagement portion 112, which may be configured to facilitate coupling the device to the fluid transport component 202. For example, in FIG. 3, the example device 300 can be coupled to the stem 302 using a variety of coupling means selected by appropriate engineering judgment. In one implementation, the example device 300 may be threaded onto the stem 302, for example, where the leading end of the stem 206 comprises external threading and the trailing end 106 of the device 300 comprises internal threading. In this implementation, a tool (e.g., wrench) may engage the tool engagement portion 112 (e.g., a flat surface), and the tool may be used to thread the example device 300 onto the stem 302. It should be appreciated that other means for coupling the example device 300 to a fluid transport component (e.g., 202) are anticipated, and those skilled in the art may devise alternate means. For example, the example device could be press fit, fastened (e.g., using a separate fastener), adhered (e.g., soldered, welded, glued, etc.) cam locked, or otherwise engaged with the fluid transport component.

In one implementation, as illustrated in FIGS. 2, 3 and 4, at least one of fluid inlets (e.g., 110) can be disposed at an angle between zero degrees (0°) 258 and ninety degrees (90°) 256 from a plane that comprises a line 252 lying in a direction of fluid flow 260 along the lateral surface 102, toward the trailing end 106. In one implementation, the example device 300 can comprise one or more inlet opening 208, 210 that respectively lead to a fluid passage 216, 218. As an example, a first fluid inlet opening 208, disposed in a first depression 212, may fluidly couple with a first fluid passage 216.

Further, as an example, a second fluid inlet opening 210, disposed in a second depression 214, may fluidly couple with a second fluid passage 218. In this implementation, an angle at which the fluid passage 216, 218 lies from the lateral surface 102 toward the trailing end 106, for example, may be between zero and ninety degrees from the lateral surface 102. A variety of angles for the fluid passage(s) 216, 218 are anticipated, and the angle implemented may be based at least upon characteristics of use of a system utilizing the example device (e.g., 100, 300). For example, a system configured to be utilized in water may comprise an approximately thirty degree angle, while a system utilized in a more viscous fluid may comprise a higher angle (e.g., or lower), depending on fluid flow characteristics of the fluid, capillarity characteristics of the fluid and/or debris/content entrained in the fluid, or other fluid/debris characteristics, etc.

In one implementation, as illustrated in FIGS. 2, 3 and 4, the example device 300 can comprise a chamber 204. The chamber 204 can be generally, centrally disposed, such as lying along a central lateral axis 254 of the body of the device 300. Further, in this implementation, the chamber 204 can be fluidly coupled with at least one of the fluid inlets 110. The chamber 204 can also be fluidly coupled with the fluid transport component 202, such as through the fluid transport fluid passage 220, when the trailing end 106 is operably coupled with the fluid transport component 202. For example, the one or more fluid inlet openings 208, 210 can be fluidly couple with respective fluid passages 216, 218, which are fluidly coupled with the chamber 204. In this way, in this implementation, the chamber 204 can be configured to receive fluid from the at least one fluid inlet 108. Further, for example, having the chamber 204 fluidly couple with the fluid transport component 202, may provide for fluid flow 220 from the one or more fluid inlet openings 208, 210 to the fluid transport fluid passage 220.

In one implementation, the chamber 204 can be configured to provide a desired fluid pressure to the fluid transport component 202. For example, the chamber 204 can be sized, and/or shaped, in a manner that controls an amount of fluid pressure in the fluid transport fluid passage 220 of the fluid transport component 202. In this example, the size and/or shape of the chamber 204 may allow merely a desired amount of fluid to flow 250 into the fluid transport component 202, which can be further determined by an expected amount of fluid pressure encountered by the fluid flow 150. That is, the size, shape, and/or depth of the chamber 204 may be indicated by an expected use of the example, device 100, 300. For example, a high pressure firefighting nozzle may indicate a first configuration of the chamber 204, such that a first desired fluid pressure is encountered in the fluid transport component 202; and, a low pressure fluid dispensing nozzle may indicate a second configuration of the chamber 204, such that a second desired fluid pressure is encountered in the fluid transport component 202.

In one implementation, the chamber 204 can be configured to provide sufficient fluid pressure to allow a valve component 304 disposed in a stem 302 of a nozzle 402 to operate in a desired manner. As an example, as illustrated in FIGS. 3 and 4, the example device 300 may be coupled with a stem 302, which itself is disposed in a high pressure fluid dispensing nozzle 402. In this example, a valve component 304 may be configured to receive varying fluid pressures from a fluid flow 352 in the stem 302 (e.g., based on conditions and use), which may be used to indicate modifications in the nozzle 402. For example, when fluid pressure changes occur in a fluid supply 350, the nozzle 402 may modify a fluid dispensing operation of the nozzle to accommodate the changes, based on the fluid pressure in the fluid flow 352 in the stem. In this example, a threshold amount of fluid pressure from the fluid flow 352 may overcome a biasing of the valve component 304, allowing for fluid to flow around or through the valve component 304. In this example, the flow around or through the valve component 304 may initiate modifications to the nozzle output components. Further, in another example, the fluid pressure from the fluid flow 352 may force the baffle head open, allowing the baffle 306 to move laterally, at least until overcome by the biasing force (e.g., spring) in the baffle head.

In one aspect, a fluid inlet may be devised for use in a fluid dispensing nozzle. In this aspect, the fluid inlet can be disposed on a fluid inlet portion of a stem portion of the nozzle, and can be configured to mitigate intake of debris into the inlet, and into the stem of the nozzle. In one implementation, as illustrated in FIGS. 2-4, the fluid inlet can comprise a generally cylindrically shaped body 112, comprising a generally dome-shaped leading end 104. The leading end 104 can be configured to direct a flow of fluid 350 toward a lateral portion 102 of the body 112.

Further, in this implementation, the fluid inlet 200 can comprise a first fluid inlet opening 208 that is disposed in a first depression 212 in the lateral portion 102 of the body 112. The first fluid inlet opening 208, in the first depression 212, is disposed below a surface of the lateral portion 102 of the body 112. In implementation, the first depression 212 can be configured to allow the flow of fluid 152 into the first fluid inlet opening 208, and mitigate a flow of debris 154, entrained in the fluid, into the first fluid inlet opening 208.

Additionally, in this implementation, the fluid inlet 200 can comprise a first fluid passage 216 that is configured to fluidly couple the first fluid inlet opening 208 with a stem fluid passage 220 disposed in a stem 302 of a nozzle 402. As an illustrative example, the fluid inlet can be engaged with the stem 302 and placed in a path of fluid flow 350 in the nozzle 402. When in use, the nozzle 402 can be coupled with a fluid line (e.g., hose) that draws fluid for a fluid source, such as a storage vessel, hydrant, pool, pond, etc. A fluid source can potentially comprise entrained debris, such and dirt particles and other undesired, non-fluid debris. Uptake of this type of debris can potentially result in undesirable operational characteristics of the nozzle, such as clogging, diminished flow, undesired flow profile, etc.

In this implementation, for example, the shape of the leading end 104 can direct the fluid flow 350 around the leading end 104, and to the lateral surface 102. Further, due to the shape and location of the first depression 212 (e.g., and a second depression 214), a flow of fluid 352 can flow into the depression 212, due, at least in part, to capillarity characteristics of the fluid. Additionally, because the debris is not likely to display capillarity, the debris entrained fluid flow 154 can be directed over the depression 212, and continue through and exit the nozzle 402 with a main flow of fluid 350, as illustrated in FIG. 4.

In one implementation, the fluid inlet 200 can comprise a second fluid inlet opening 210. The second fluid inlet opening 210 can be disposed in the first depression 212. For example, the first depression 212 may be disposed around the circumference of the lateral surface 102 of the body 112, and the first and second fluid inlet openings 208, 210 can be disposed at different locations in the first depression 212. In another implementation, the second fluid inlet opening 210 can be disposed in a second depression 214, which is disposed in the lateral portion 102 of the body 112. The second depression 214 may be configured to allow the flow of fluid 152, 352 into the second fluid inlet opening 210, and to mitigate a flow of debris 154, 350, entrained in the fluid, into the second fluid inlet opening 210. In this implementation, the flow of fluid 352, comprising less debris, for example, can flow into the first depression 212 (e.g., and/or a second depression 214), and flow into the first fluid opening 208 and/or a second fluid opening 210.

Additionally, in this aspect, the fluid inlet 200 can comprise a generally centrally disposed chamber 204 that is fluidly coupled with the first fluid passage 216, and fluidly coupled with the stem fluid passage 220, when the body 112 is coupled with the stem 302. The fluid inlet 200 can also comprise a second fluid passage 218 that fluidly couples the second fluid inlet opening 210 with the chamber 204. In one implementation, the chamber 204 can be configured to provide sufficient fluid pressure to allow a valve component 304, disposed in the stem 302 of the nozzle 402, to operate in a desired manner. That is, for example, the chamber 204 can be sized and/or shaped in a manner that allows a desired amount of fluid pressure in the stem fluid passage 220, such that the valve 304 can operate according to desired specifications for use of the nozzle 402, and/or the baffle head of the baffle 306 may operate according to desired specifications for use of the nozzle 402.

Figure 5:
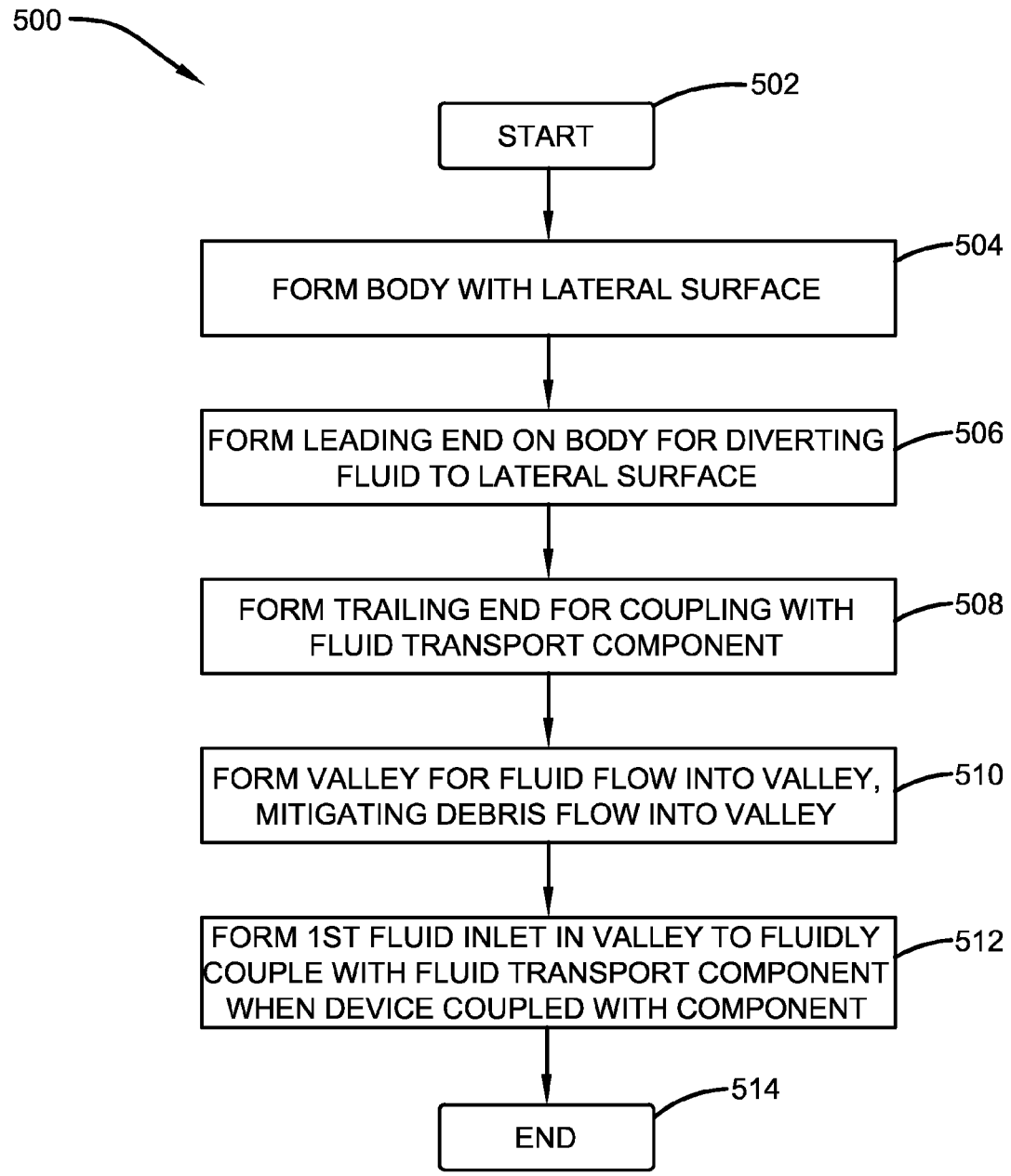
FIG. 5 is a flow diagram illustrating an exemplary method for making one or more portions of one or more systems descried herein.

A method of making a device for mitigating debris uptake in a fluid inlet can be devised. FIG. 5 is a flow diagram illustrating an exemplary method 500 for making a device for mitigating debris uptake in a fluid inlet. The exemplary method 500 begins at 502. At 504, a body of the device can be formed, where the body comprises a lateral surface. At 506, a leading end can be formed in the body, where the leading end may be configured to be disposed in a fluid flow path. Further, the leading end can configured to divert fluid to the lateral surface while mitigating turbulence in the flow of fluid.

At 508, a trailing end can be formed in the body, where the trailing end may be configured to operably couple with a fluid transport component. At 510, a valley can be formed in the body, and the valley can be disposed, at least partially, around the circumference of the lateral surface, and generally perpendicular to the flow of the fluid. Further, the valley can be configured to allow a fluid to flow into the valley while mitigating a flow of debris, entrained in the fluid, into the valley. At 512, a first fluid inlet can be formed in the valley, where the fluid inlet may be configured to fluidly couple with the fluid transport component when the trailing end is operably coupled with the fluid transport component. Having formed the first fluid inlet, the exemplary method 500 ends at 514.

In one implementation of the exemplary method 500, a second fluid inlet can be formed in the valley, where the second fluid inlet can be configured to fluidly couple with the fluid transport component when the trailing end is operably coupled with the fluid transport component. In this implementation, the first and second fluid inlets can be disposed at an angle between zero degrees and ninety degrees from a surface of the lateral surface of the body, toward the trailing end of the body.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A device for mitigating debris uptake in a fluid inlet disposed in a fluid flow path, comprising:
    a lateral surface;
    a leading end configured to be disposed in a fluid flow path to divert fluid to the lateral surface while mitigating turbulence in the flow of fluid;
    a trailing end configured to operably couple with a fluid transport component;
    a valley disposed, at least partially, around the perimeter of the lateral surface, generally perpendicular to the flow of the fluid, the valley configured to allow a fluid to flow into the valley while mitigating a flow of debris, entrained in the fluid, into the valley; and
    at least one fluid inlet disposed in the valley, the fluid inlet fluidly coupled with an internal chamber by a fluid passage having an outlet;
    the fluid inlet disposed closer to the leading end than the fluid passage outlet.

2. The device of claim 1, the chamber fluidly coupled with the fluid transport component when the trailing end is operably coupled with the fluid transport component to discharge fluid in a pressurized stream.

3. The device of claim 1, the leading end comprising a generally dome-shaped surface that merges with a generally cylindrically-shaped lateral surface.

4. The device of claim 1, the lateral surface comprising at least one tool engagement portion configured to facilitate coupling the device to the fluid transport component.

5. The device of claim 1, the lateral surface comprising a generally frustoconical shape, where a leading end of the lateral surface comprises a smaller circumference than the circumference of a trailing end of the lateral surface.

6. The device of claim 1, the fluid passage disposed at an angle between zero degrees and ninety degrees from a central axis of the device lying in a direction of fluid flow.

7. The device of claim 1, the chamber generally centrally disposed, and fluidly coupling the fluid inlet with the fluid transport component when the trailing end is operably coupled with the fluid transport component.

8. The chamber of claim 7, the chamber configured to provide desired fluid pressure to the fluid transport component.

9. The chamber of claim 7, the chamber configured to provide sufficient fluid pressure to allow a valve component disposed in a stem of a nozzle to operate in a desired manner.

10. The device of claim 1, the trailing end configured to selectably couple with the leading end of the fluid transport component.

11. The device of claim 1, an entrance of the at least one fluid inlet disposed below a plane comprising a line lying in a direction of fluid flow along the lateral surface.

12. A fluid inlet for a stem of a nozzle, comprising:
    a generally cylindrically shaped body, comprising a generally dome-shaped leading end configured to direct a flow of fluid toward a lateral portion of the body;
    a first fluid inlet opening disposed in a first depression in the lateral portion of the body, below a surface of the lateral portion of the body, the first depression configured to allow the flow of fluid into the first fluid inlet opening and mitigate a flow of debris, entrained in the fluid, into the first fluid inlet opening; and
    a first fluid passage configured to fluidly couple the first fluid inlet opening with a stem fluid passage disposed in a stem of a nozzle, the first fluid passage comprising an outlet to the stem fluid passage;
    the first fluid inlet disposed closer to the leading end than the first fluid passage outlet.

13. The inlet of claim 12, the lateral portion of the body comprising a generally frustoconical shape, a leading end of the lateral portion of the body comprising a smaller diameter than the diameter of a trailing end of the lateral portion of the body.

14. The inlet of claim 12, the first fluid passage disposed at an angle between zero degrees and ninety degrees from a central axis of the device lying in a direction of fluid flow.

15. The inlet of claim 12, comprising at least a second fluid inlet opening disposed in either:
    the first depression; or
    a second depression in the lateral portion of the body, below a surface of the lateral portion of the body, the second depression configured to allow the flow of fluid into the second fluid inlet opening and mitigate a flow of debris, entrained in the fluid, into the second fluid inlet opening.

16. The inlet of claim 15, comprising a second fluid passage fluidly coupled with the second fluid inlet opening, and comprising a second outlet disposed further away from the leading end than the second fluid inlet opening.

17. The inlet of claim 12, comprising a generally centrally disposed chamber fluidly coupled with the first fluid passage, and with the stem fluid passage when the body is coupled with the stem.

18. The inlet of claim 17, the chamber configured to provide sufficient fluid pressure to allow a valve component disposed in the stem of the nozzle to operate in a desired manner.

19. A method for making a device for mitigating debris uptake in a fluid inlet, comprising:
    forming a body comprising a lateral surface;
    forming a leading end in the body, the leading end configured to be disposed in a fluid flow path, and configured to divert fluid to the lateral surface while mitigating turbulence in the flow of fluid;
    forming a trailing end in the body, the trailing end configured to operably couple with a fluid transport component;
    forming a valley in the body, disposed, at least partially, around the circumference of the lateral surface, and generally perpendicular to the flow of the fluid, the valley configured to allow a fluid to flow into the valley while mitigating a flow of debris, entrained in the fluid, into the valley; and
    forming a first fluid inlet in the valley, the fluid inlet configured to fluidly couple with an internal chamber by a first fluid passage having an outlet;
    the first fluid inlet disposed closer to the leading end than the first fluid passage outlet.

20. The method of claim 19, comprising:
    forming a second fluid inlet in the valley, the second fluid inlet configured to fluidly couple with the internal chamber by a second fluid passage having an outlet disposed further away from the leading end than the second fluid inlet.

* * * * *